United States Patent
Hilsenrath et al.

[11] Patent Number: 6,026,304
[45] Date of Patent: Feb. 15, 2000

[54] RADIO TRANSMITTER LOCATION FINDING FOR WIRELESS COMMUNICATION NETWORK SERVICES AND MANAGEMENT

[75] Inventors: Oliver Hilsenrath, Alamo; Mati Wax, San Ramon, both of Calif.

[73] Assignee: U.S. Wireless Corporation, San Ramon, Calif.

[21] Appl. No.: 08/780,565

[22] Filed: Jan. 8, 1997

[51] Int. Cl.[7] ....................................... H04Q 7/20
[52] U.S. Cl. .......................... 455/456; 455/457; 455/560
[58] Field of Search ..................... 455/456, 457, 455/560, 63; 370/329, 334, 335; 342/457, 372, 387

[56] References Cited

U.S. PATENT DOCUMENTS

| | | |
|---|---|---|
| 4,257,047 | 3/1981 | Lipsky . |
| 4,313,117 | 1/1982 | Lipsky . |
| 4,728,959 | 3/1988 | Maloney et al. . |
| 4,750,147 | 6/1988 | Roy, III et al. ............ 364/807 |
| 4,799,062 | 1/1989 | Sanderford, Jr. et al. .......... 342/450 |
| 5,208,756 | 5/1993 | Song . |
| 5,317,323 | 5/1994 | Kennedy et al. ................ 342/457 |
| 5,327,144 | 7/1994 | Stilp et al. ................ 342/387 |
| 5,396,224 | 3/1995 | Dukes et al. ............ 340/825.49 |
| 5,420,910 | 5/1995 | Rudokas et al. ............ 455/33.1 |
| 5,444,451 | 8/1995 | Johnson et al. ................ 342/453 |
| 5,508,707 | 4/1996 | Leblanc et al. . |
| 5,512,908 | 4/1996 | Herrick ........................ 342/387 |
| 5,515,378 | 5/1996 | Roy, III et al. ................ 370/95.1 |
| 5,546,090 | 8/1996 | Roy, III et al. ................ 342/174 |
| 5,548,583 | 8/1996 | Bustamante ................ 370/18 |
| 5,570,412 | 10/1996 | Leblanc ................ 455/456 |
| 5,592,490 | 1/1997 | Barratt et al. ................ 370/310 |
| 5,602,903 | 2/1997 | Leblanc et al. . |
| 5,608,410 | 3/1997 | Stilp et al. . |
| 5,634,199 | 5/1997 | Gerlach et al. ............ 455/63 |
| 5,694,416 | 12/1997 | Johnson . |
| 5,724,660 | 3/1998 | Kauser et al. ................ 455/456 |
| 5,748,683 | 5/1998 | Smith et al. . |
| 5,768,686 | 3/1999 | Leblanc et al. . |

FOREIGN PATENT DOCUMENTS

| | | |
|---|---|---|
| 0689369A1 | 6/1995 | European Pat. Off. . |
| WO 97/15961 | 10/1996 | WIPO . |

OTHER PUBLICATIONS

Derek Gerlach et al., "Spectrum Reuse Using Transmitting Antenna Arrays with Feedback", IEEE, vol. 4, pp. 97–100, (1994).

Derek Gerlach et al., "Adaptive Transmitting Antenna Arrays with Feedback," IEEE Signal Processing Letters, vol. 1, No. 10, pp. 150–152, (1994).

(List continued on next page.)

Primary Examiner—Dwayne D. Bost
Assistant Examiner—Linwood C. Scott, Jr.
Attorney, Agent, or Firm—Lumen Intellectual Property Services

[57] ABSTRACT

A method and apparatus for location finding in a wireless communication system uses multipath signals in order to accurately determine a transmitter's location. Direct path and multipath signals from a mobile transmitter [74] arrive at an antenna array [80, 82, 84] of a base station receiver [76]. The base station determines signal signature from a subspace of an array covariance matrix. The signature is compared to a database of calibrated signal signatures and corresponding locations, and a location whose calibrated signature best matches the measured signature is selected as the most likely transmitter location. The database of calibrated signal signatures and corresponding locations is generated by a calibration procedure in which a phone [74] transmits location data derived from a GPS receiver [88] and GPS satellites [90, 92, 94] to the base station [76] which records the location information together with the signal signature of the transmitter [74]. The location information can be used to increase the performance of a cellular telephone network and provide useful services to cellular telephone customers.

44 Claims, 14 Drawing Sheets

OTHER PUBLICATIONS

Derek Gerlach et al., "Adaptive Transmitting Antenna Methods for Multipath Environments", IEEE, pp. 425–429, (1994).

Derek Gerlach et al, "Base Station Transmitter Antenna Arrays with Mobile to Base Feedback", IEEE, pp. 1432–1436, (1993).

A. Swindlehurst, "Subspace Fitting with Diversely Polarized Antenna Arrays", IEEE, vol. 41, No. 12, pp. 1687–1694, (1993).

RADIO TRANSMITTER LOCATION FINDING FOR WIRELESS COMMUNICATION NETWORK SERVICES AND MANAGEMENT

FIELD OF THE INVENTION

This invention relates generally to methods for passively determining the location of a radio transmitter. More particularly, it relates to methods for determining the location of cellular telephones in severe multipath urban environments and applications of such methods to cellular telephone network services and management.

BACKGROUND OF THE INVENTION

A long standing problem in radio communications is accurately determining the location of a mobile radio transmitter. Precise location information in a cellular telephone network is desirable for various reasons that have been recognized in the prior art. For example, U.S. Pat. No. 5,515,378 to Roy, III et al. discloses the application of location information to mitigating the hand-off problem, increasing signal sensitivity, reducing crosstalk, and increasing cell capacity. Also disclosed is the use of location information to dynamically track the trajectories of mobiles. This source tracking makes use of an extended Kalman filter, and can include the tracking of velocities and accelerations as well as positions, and the tracking of multiple mobiles whose trajectories cross. U.S. Pat. No. 5,512,908 to Herrick mentions the application of cellular location information to 911 dispatching, tracking unauthorized cell phone usage, and tracking or locating commercial and/or government vehicles. U.S. Pat. No. 5,327,144 to Stilp et al. also mentions various applications of mobile location information, such as locating lost or stolen vehicles, assisting lost motorists, and dispatching emergency vehicles. These applications have yet to be realized, however, because they require accurate location information and no adequate method of providing such information has yet been developed.

Multipath is the greatest obstacle to prior art methods of solving the location finding problem. As shown in FIG. 1, multipath is typically caused by the reflection of signals from objects in the environment, such as buildings, hills, and other structures. A signal transmitted from a cellular phone 30, for example, is reflected from structures 32, 34, and 36, resulting in three multipath signals arriving at a base station 38 in addition to a direct path signal. Due to the multipath signals, it appears from the perspective of base station 38 that three additional cellular phones 40, 42, and 44 are transmitting similar signals from different locations. In some cases, signals from a phone 50 can arrive at base station 38 from nearly opposite directions, one from actual phone 50 and another from a "ghost" phone 52. Moreover, because the path lengths of the multipath signals differ from that of the direct path signal, the multipath signals have differential time delays with respect to the direct path signal. In an urban environment where severe multipath is present, sometimes no direct path exists and the base station receives only multipath signals. For example, phone 46 has no direct path signal to base 38. Consequently, it appears from base 38 that a unique signal is originating from a "ghost" phone 48 which has a very different location from actual phone 46. Clearly, multipath significantly complicates the communication of signals, and, in particular, complicates the problem of accurately determining the true location of a transmitter. Since a large proportion of cellular phone usage is in urban environments which have severe multipath, it is especially important to solve this problem. All prior art methods, however, have failed to provide consistent and accurate location information in multipath environments.

As illustrated in FIG. 2, a common prior art approach to determining the position of a mobile phone 52 involves measuring temporal information, e.g. time of arrival (TOA) or time difference of arrival (TDOA), at three or more synchronized base stations 56, 58, and 60. By communicating this temporal information between the base stations over a communication line 62, the transmitter location can be determined. This type of approach is disclosed, for example, in U.S. Pat. No. 5,548,583 to Bustamante, U.S. Pat. No. 5,512,908 to Herrick, U.S. Pat. No. 5,327,144 to Stilp et al., U.S. Pat. No. 5,317,323 to Kennedy et al., and U.S. Pat. No. 4,799,062 to Sanderford, Jr. et al. These methods have the disadvantage that they require several base stations, and that signals from cellular phone 54 be received by all base stations 56, 58, and 60 simultaneously. Additionally, expensive high accuracy clocks are required at the base stations and expensive high bandwidth communication lines 62 are required between the base stations in order to allow accurate temporal correlation of their received signals from phone 54. More significantly, this approach encounters serious difficulties in urban environments since multipath causes temporal delays and creates "ghost" transmitters. Consequently, it fails to determine positions accurately and consistently in many cases.

Although the prior art does disclose several techniques for location finding that attempt to mitigate multipath effects, they all fail in the presence of severe multipath. Bustamante does not acknowledge problems due to severe multipath. Herrick teaches a method for mitigating inaccuracies due to multipath by averaging over several TOA measurements at differing frequencies. Stilp teaches a method of compensating for multipath through the use of algorithms that can distinguish direct path from multipath signals and eliminate or ignore the latter. Kennedy also teaches the mitigation of multipath through algorithms that distinguish multipath signals from direct signals by determining angles of arrival, times of arrival, and signal strength. Sanderford teaches a method for multipath mitigation using spread-spectrum (frequency hopping) transmissions from the mobiles. These techniques are all characterized by an attempt to cope with multipath by circumvention or discrimination of multipath signals from direct path signals. In cases of severe multipath, however, there often is no direct path signal at all. In such cases, these approaches fail. Moreover, averaging techniques are based on assumptions about the distribution of multipath that are not generally valid, especially in severe multipath environments. Even in cases where such assumptions do hold, these averaging techniques do not yield accurate position information.

Stilp discloses a method for location finding which involves creating a grid of theoretical signal delay values. The calculation of the theoretical values incorporates biases at the base station sites due to mechanical, electrical, or environmental factors. The biases for the base station sites are determined by measuring the signals from reference transmitters having known locations. Any variance between the known position and the calculated position is assumed to be caused by site biases. It is further assumed that these same biases will affect other cellular phones at other unknown locations, i.e. the site biases are assumed to depend only on the site and not on the mobile locations. Dues to these assumptions, the method can not account for biases due to severe multipath, which changes dramatically in dependence upon the mobile location. Moreover, since this technique is based upon TDOA measurements, it is problematic for the additional reasons already discussed.

As illustrated in FIG. 3, another prior art approach determining the location of a phone 68 makes use of antenna arrays 64 and 66 for direction finding. For example, U.S. Pat. No. 5,515,378 to Roy, III et al. discloses a method and apparatus for estimating positions and velocities of mobiles from antenna array measurements of their signals. As is well-known in the art, a processor forms an average covariance matrix from a collection of array vectors received at each antenna array and performs spatial smoothing and/or forward/backward temporal averaging as appropriate. Signal and noise subspaces are then calculated using an eigendecomposition of the resulting covariance matrix. Signal detection is then accomplished by a statistical technique such as weighted subspace fitting (WSF) detection. A maximum likelihood estimator is employed to then obtain the signal parameter estimates, such as the direction of arrival (DOA). When an estimate of location is made based only on the directional information from a single base station, such an estimate has a very poor accuracy. To obtain more accurate location estimation, the DOA parameters must be supplemented by TOA measurements and/or parameter measurements sent over a communication line 72 from other base stations. Even in this case, however, the estimates are still not sufficient to accurately determine a correct location since a direct path may not exist at all, as in severe multipath environments. For example, since no direct path exists from phone 68 to either base station 64 or 66, phone 68 will appear to be located at the location of a false "ghost" phone 70.

Other more recent work in mobile communications has attempted to cope with severe multipath, albeit not for location determination applications. For example, Gerlach et al. in "Adaptive Transmitting Antenna Methods for Multipath Environments" discloses a base station beamforming method which uses feedback from a mobile to determine a characteristic subspace of the mobile's instantaneous channel vector. Although the instantaneous channel vector can change rapidly in a strong multipath environment, Gerlach et al. point out that it is normally restricted to a characteristic subspace that is much more stable in time. By tracking this channel subspace rather than the channel vector, much lower feedback rates are required. A collection of instantaneous channel vectors are measured, and the sum of their outer products is taken to produce a channel matrix. The eigenvectors having large eigenvalues define a subspace of this matrix which is a more stable representation of the receiver's channel. This subspace is then used in beamforming at the base station to minimize crosstalk and maximize the desired signal at the mobiles. Although this approach reduces the amount of feedback required for beamforming in severe multipath environments, it does not have obvious application to location finding.

U.S. Pat. No. 4,799,062 to Sanderford, Jr. et al. proposes an approach to location finding using a differential multipath signal technique. They point out that when the positions of two mobiles are close to each other, their multipath signals should be nearly the same. Consequently, if a reference signal from a known transmitter location near the mobile were subtracted from the mobile's signal, the multipath effects should cancel and the differential position between the two could be determined. The disclosure, however, does not explain in detail how such a method might be implemented. Moreover, in severe multipath environments the approach outlined fails. Since the multipath components of the signal can change significantly over distances on the order of 10 meters or less, the differential position will be accurate only in cases where the mobile is already within sight of the mobile, therefore defeating the purpose of the technique. Even in cases of less severe multipath, the need for a reference signal makes the technique unattractive to implement.

OBJECTS AND ADVANTAGES OF THE INVENTION

Accordingly, it is a primary object of the present invention to provide a method for accurately determining the position of a mobile radio transmitter, even in severe multipath environments. It is another object of the invention to provide such a method for location finding that requires only a single base station. Another object of the invention is to provide for the realization of many cellular network services and management applications that have heretofore been unattainable due to the absence of accurate and consistent location finding techniques. Accordingly, it is another object of the invention to use location information to provide sophisticated tools and techniques for intelligently managing cellular networks and for providing improved service to cellular network users.

It is an object of the invention to provide a system for tracking and locating all cellular telephone traffic from a single base station. It is also an object to provide such a system that does not require a calibrated antenna array, does not require the phones to be responsive or cooperative, and does not require line-of-sight communication between the array and the phones. These and other advantages will become apparent from the following description and accompanying drawings.

SUMMARY OF THE INVENTION

In contrast with all prior art location finding methods which attempt to eliminate or avoid multipath signals, the present invention advantageously uses multipath signals in order to accurately determine a transmitter's location. More specifically, signals from a mobile transmitter are sent to an antenna array of a base station receiver which is part of a wireless communication system such as a cellular telephone network. Based upon the signals received at the antenna array, the base station determines a signal signature. In general, the signal signature is any location-dependent feature derived from the set of direct and multipath signals received at the antenna array of a single base station from a transmitter at a given location. The signature may be derived from any combination of amplitude, phase, delay, direction, and polarization information of the signals. Preferably, the signature is substantially invariant with respect to all variables unrelated to transmitter position, such as noise. One embodiment of the invention includes determining a subspace of an array covariance matrix and using the subspace as the signal signature.

After the signal signature has been determined, it is then compared to a database of calibrated signal signatures and corresponding locations. In one aspect of the invention, the database of calibrated signal signatures and corresponding locations is generated by a calibration procedure in which GPS location data of a calibration mobile is associated with the signal signature of the mobile. By searching such a database, a location whose calibrated signature best matches the measured signature is selected as the most likely location. In this manner, the location of the transmitter can be accurately determined from a signal received at a single base station, even in a severe multipath environment.

Surprisingly, in contrast to other techniques of location finding, the present technique is characterized by improved accuracy in multipath environments. The invention, therefore, provides a unique and surprising solution to the location finding problem which has heretofore remained unsolved. Moreover, the present invention provides a method of location finding which, in contrast to other methods, can accurately determine a location from a single base station. This feature of the invention distinguishes it from prior techniques which either require multiple base stations or provide only very inaccurate or imprecise location information.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

A preferred embodiment of the invention comprises a system and method for determining the locations of mobile transmitters, such as cellular telephones, in a wireless communications system such as a cellular telephone network. In addition to location determination, the preferred embodiment also comprises various techniques for using and applying location information within such a communications system to improve system capacity and performance.

Figure 4:
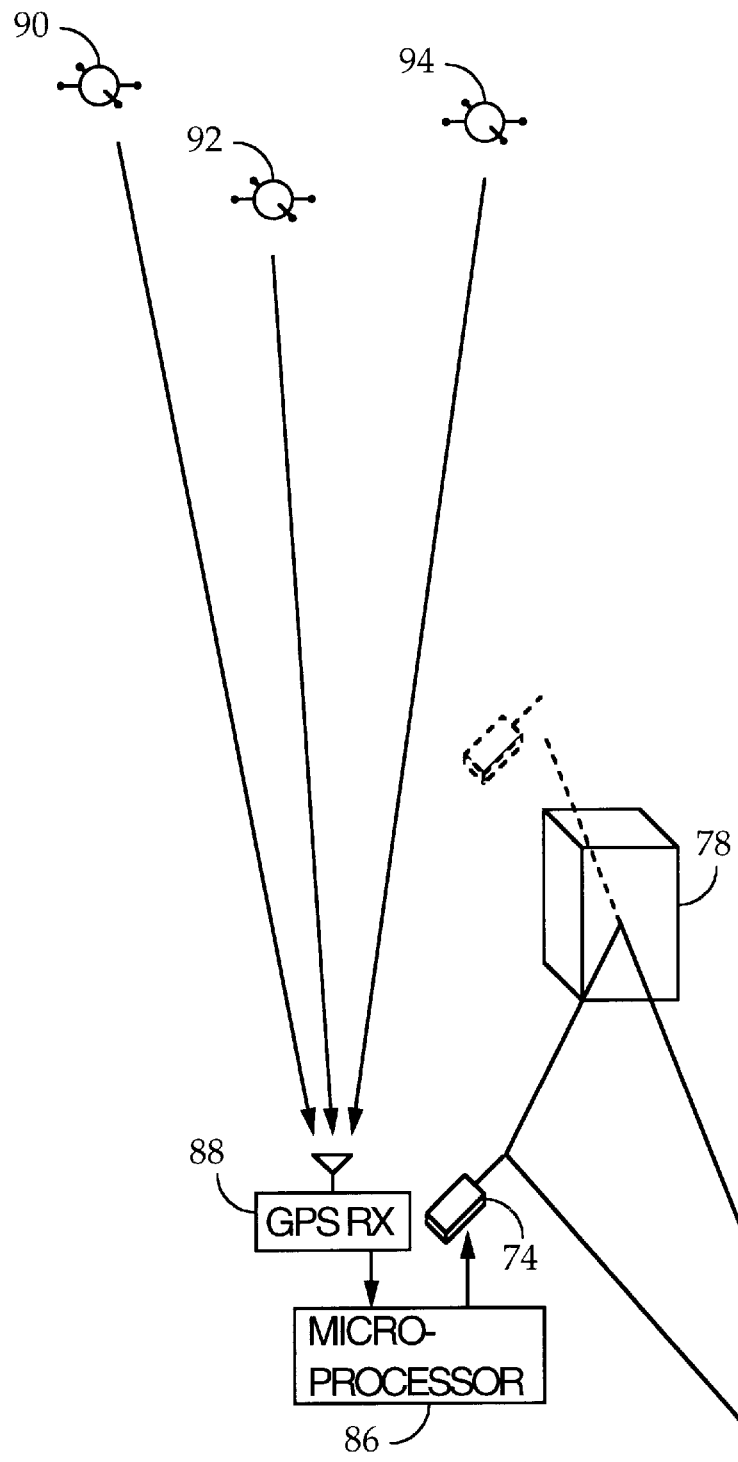
FIG. 4 illustrates locating a phone using a GPS receiver and transmitting this information to a base station in a calibration phase of the present invention.

In a communication system according to a preferred embodiment of the invention, a cellular telephone 74 transmits a signal in the vicinity of a cellular telephone base station 76, as shown in FIG. 4. Typically, in addition to a direct path signal from phone 74 to base 76, there may be additional multipath signals reflected from various environmental objects, for example, from object 78. Base station 76 is equipped to receive signals with an antenna array, multiple receivers, and signal processors, as described below in relation to FIG. 11A. In general, the antenna array has a number p of antennas. For illustrative purposes, however, the array is shown in FIG. 4 as having three antennas 80, 82, and 84. The p antennas are used to receive complex signal envelopes $x_1(t)$, $x_2(t)$, ..., $x_p(t)$, respectively, which are conventionally grouped together to form a p-dimensional array vector $x(t)=[x_1(t), x_2(t), ..., x_p(t)]^T$. In general, the dimension of the array vector $x(t)$ is equal to p, the number of antennas in the array.

Figure 5:
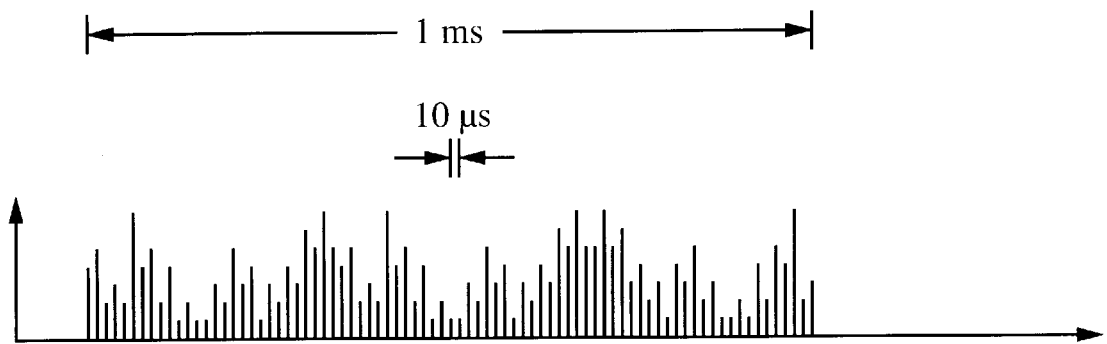
FIG. 5 is a graph of a 1 ms sampling interval containing 100 samples according to the present invention.
Figure 6:
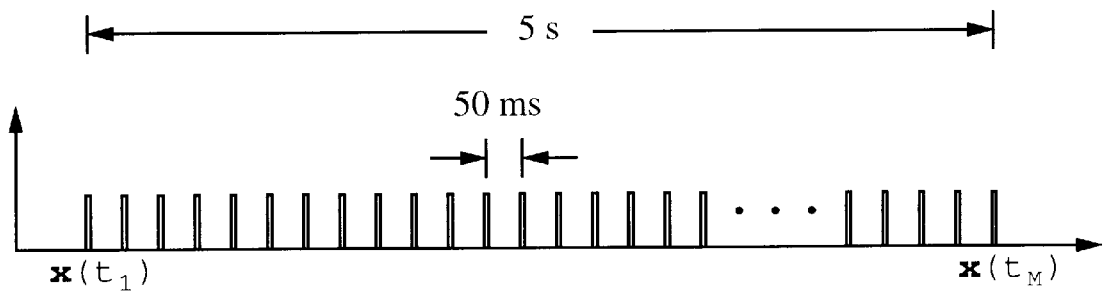
FIG. 6 is a graph of a 5 s interval containing 100 of the 1 ms sampling intervals of FIG. 5, spaced at 50 ms intervals, according to a sampling technique of the invention.

In order to obtain robustness and to reduce noise, the array vector $x(t)$ is preferably produced by sampling the antennas many times during a short time interval and averaging the samples. In the preferred embodiment the averaging is done by selecting the vector $x(t)$ to be the dominant eigenvector of the pxp correlation matrix of the samples. As illustrated in FIG. 5, a sample may be taken every 10 microseconds over an interval of 1 millisecond. The 100 samples are then used to produce a single array vector $x(t)$. As illustrated in FIG. 6, a collection of M array vectors $x(t_1), ..., x(t_M)$ is produced by performing this sampling at regular intervals.

In a preferred embodiment, array vectors are sampled at 50 millisecond intervals to produce a collection of 100 vectors. Since array vectors are sampled only once every 50 milliseconds, and each sample requires only 1 millisecond, there is sufficient time using this technique to sample up to 50 separate channels in parallel. Although the present description is focused upon the processing of one signal, in the preferred embodiment, the techniques described herein can be applied in parallel to signals on up to 50 channels. It will be recognized by those skilled in the art that although this sampling procedure is appropriate for the AMPS cellular standard it can be adapted to various other modulation schemes as well. Appropriate techniques for demodulation, demultiplexing, signal separation, sampling and averaging in various modulation schemes are well-known in the art. For example, the present invention may be adapted for, but is not limited to, any of the common wireless standards, such as AMPS, NAMPS, NMT 900, TACS, ETACS, NMT 450, C-450, RTMS, JTACS, NTACS, DAMPS (TDMA, IS-54, IS-136), GSM, DCS 1800, PCS (PCS 1800 and PCS 1900), PHS, CDMA (narrowbands, widebands, 800 MHz, 1.8 GHz or 1.9 GHz), iDen (aka MIRS), EDACS, FHMA, JDC, TETRA, APCO-25, and MPT-1327.

Figure 7:
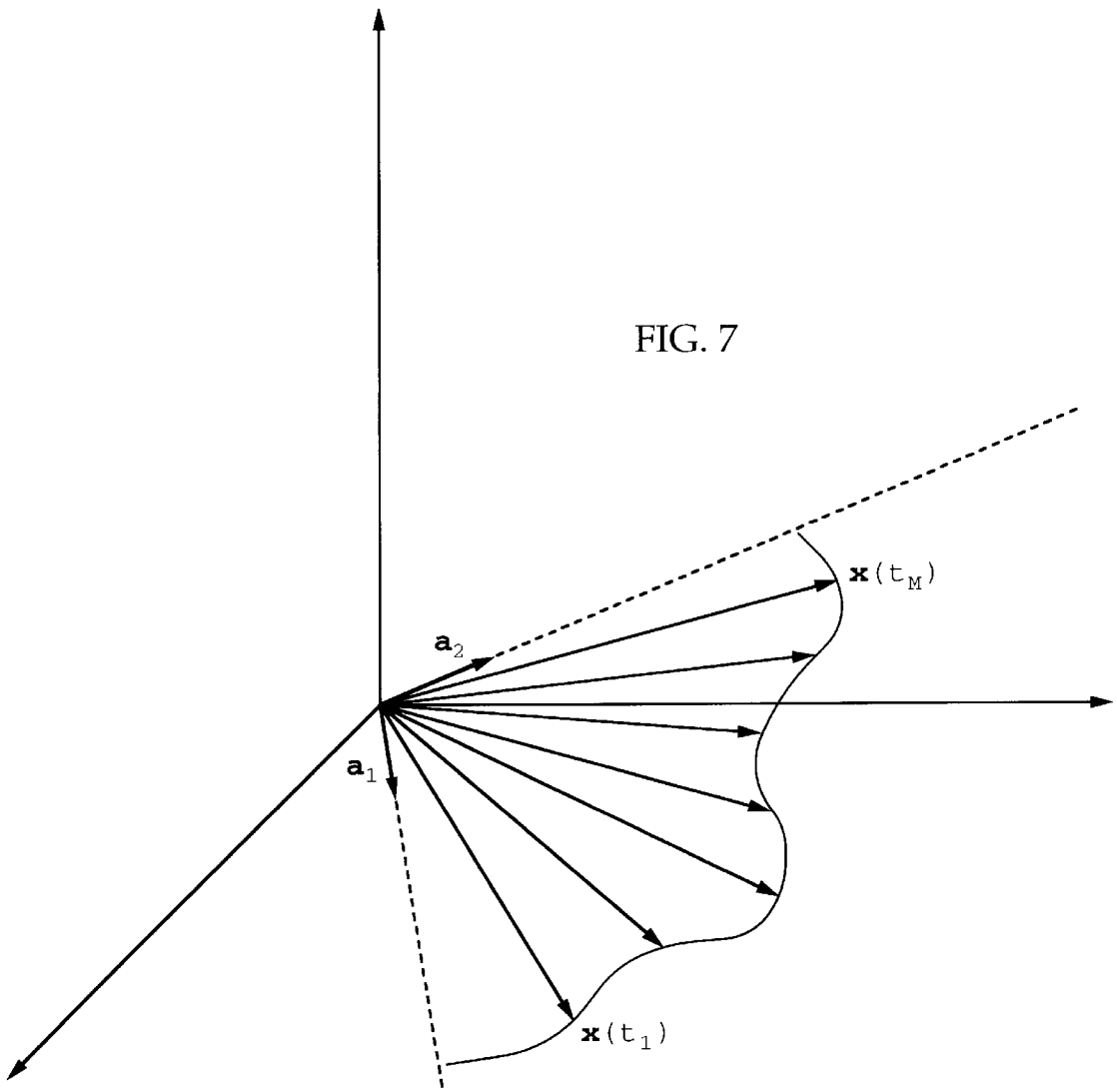
FIG. 7 is a graph of several array vectors sweeping out a signal subspace, according to the invention.

In the preferred embodiment, the collection of M array vectors are analyzed to determine a signal subspace. Although the array vector changes over the course of time due to noise, movement of the mobile, and other effects, to a good approximation the vector is confined to a subspace which is spanned by a set of q linearly independent array response vectors, $a_1, ..., a_q$, where q is the dimension of the subspace. For example, FIG. 7 illustrates a two-dimensional signal subspace in a case where p=3. (The case p=3 is chosen for simplicity of illustration only.) The two array response vectors $a_1$ and $a_2$ are a spanning set for the 2-dimensional signal subspace to which the array vectors $x(t_1), \ldots, x(t_M)$ are approximately confined. The vector $a_1$ may be physically interpreted as representing the response of array 76 in the direction of the direct path signal from phone 74, as shown in FIG. 4. Similarly, $a_2$ is the array response in the direction of the multipath signal reflected from object 78.

Since the location of phone 74 determines not only the particular value of $a_1$ associated with direct path, but also the value of $a_2$ associated with multipath, the signal subspace depends on a combination of these two vectors which are, in turn, dependent upon the specific location of phone 74. Consequently, the signal subspace may be regarded as a signal signature associated with each location. Moreover, since each multipath signal normally contributes an extra dimension to the subspace, the subspace signature will have an increased dependence upon location in the presence of severe multipath. Accordingly, as the present inventors have recognized, the location of an unknown transmitter can be determined by measuring its signal signature, and comparing it with a database containing calibrated signal signatures paired with their associated locations.

The signal subspace may be determined from the collection of M array vectors by several techniques that are well-known in the art. According to one method, the outer products of the M vectors are added together to form a pxp signal covariance matrix, $R = 1/M [x(t_1)x(t_1)^H + \ldots + x(t_M)x(t_M)^H]$. The eigenvalues of R whose magnitudes exceed a predetermined threshold determine a set of dominant eigenvectors. The signal subspace is the space spanned by these dominant eigenvectors. Equivalently, the subspace can be defined as the subspace spanned by the dominant left singular vectors obtained from a singular value decomposition of a pxM data matrix X generated from the p-dimensional array vectors $x(t_1), \ldots, x(t_M)$.

Figure 8:
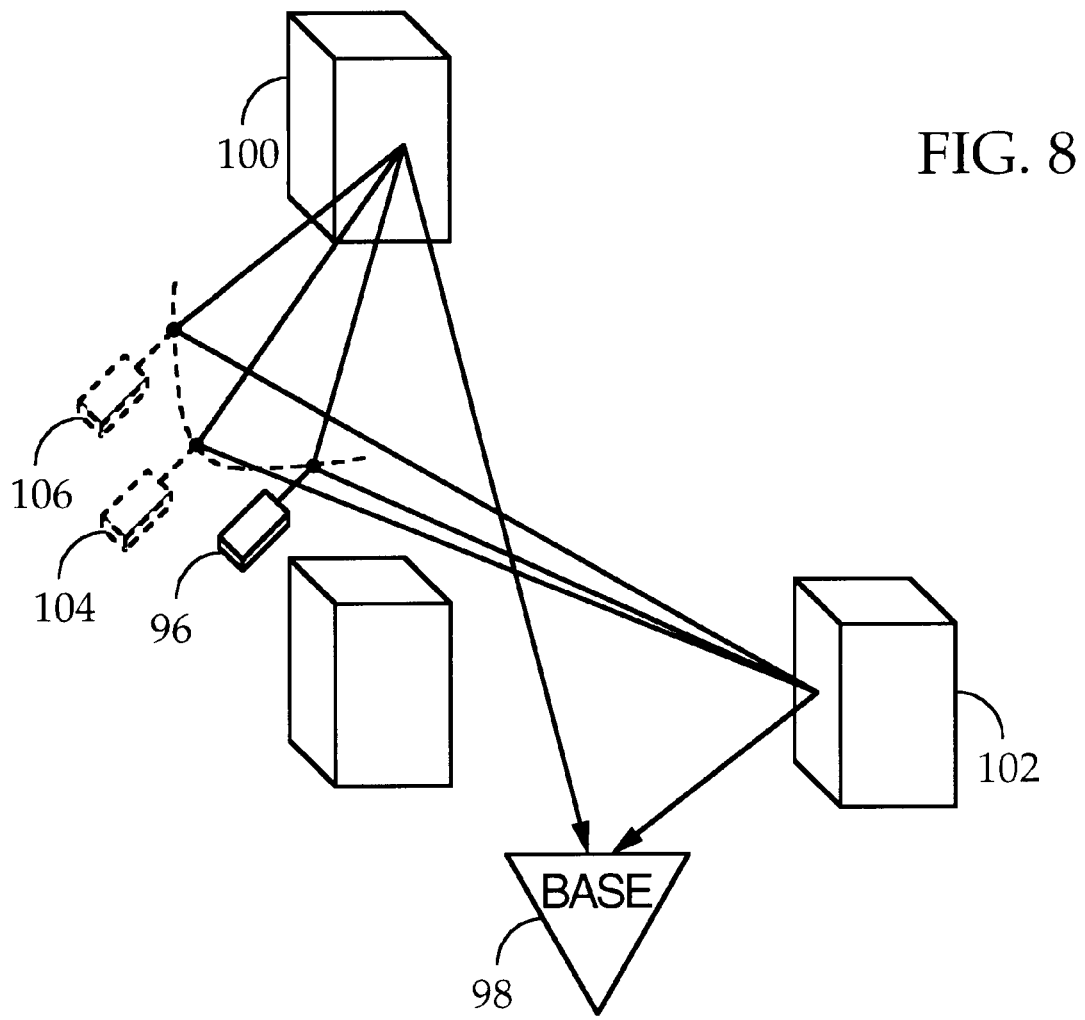
FIG. 8 illustrates a moving phone and the changing signal path lengths in a multipath environment.

It should be noted that, if a transmitter is stationary and if the differential time delays are much smaller than the reciprocal of the signal bandwidth, then the multipath and direct path signals will be coherent, i.e. they will differ only by a complex scalar factor. In this case, the measured signal subspace will be one-dimensional since the multipath signal does not contribute an additional dimension to the signal subspace. A moving transmitter, on the other hand, will decorrelate the direct and multipath signals over a distance of several wavelengths. For example, FIG. 8 shows a moving transmitter 96 and a base station 98 receiving two multipath signals reflected from objects 100 and 102. As phone 96 moves to subsequent positions 104 and 106, which may be separated by only a few wavelengths, the changes in the path lengths with time, together with the special signal sampling scheme used, cause sufficient variation of the array vectors $x(t_1), \ldots, x(t_M)$ to permit the full subspace to be determined. Accordingly, it is preferable in the calibration procedure to have signal signatures comprising multi-dimensional subspaces. The calibration procedure of the present invention uses moving vehicles to advantageously decorrelate the direct and multipath signals, thereby permitting determination of the complete signal subspace. Although a stationary transmitter will have only a one-dimensional subspace, because this subspace is within the calibrated signal subspace it is still possible to locate the transmitter, albeit with less certainty than with a moving transmitter. In the case of wideband modulation schemes or frequency hopping, however, the full signal subspace may be determined even for a stationary transmitter.

Figure 1:
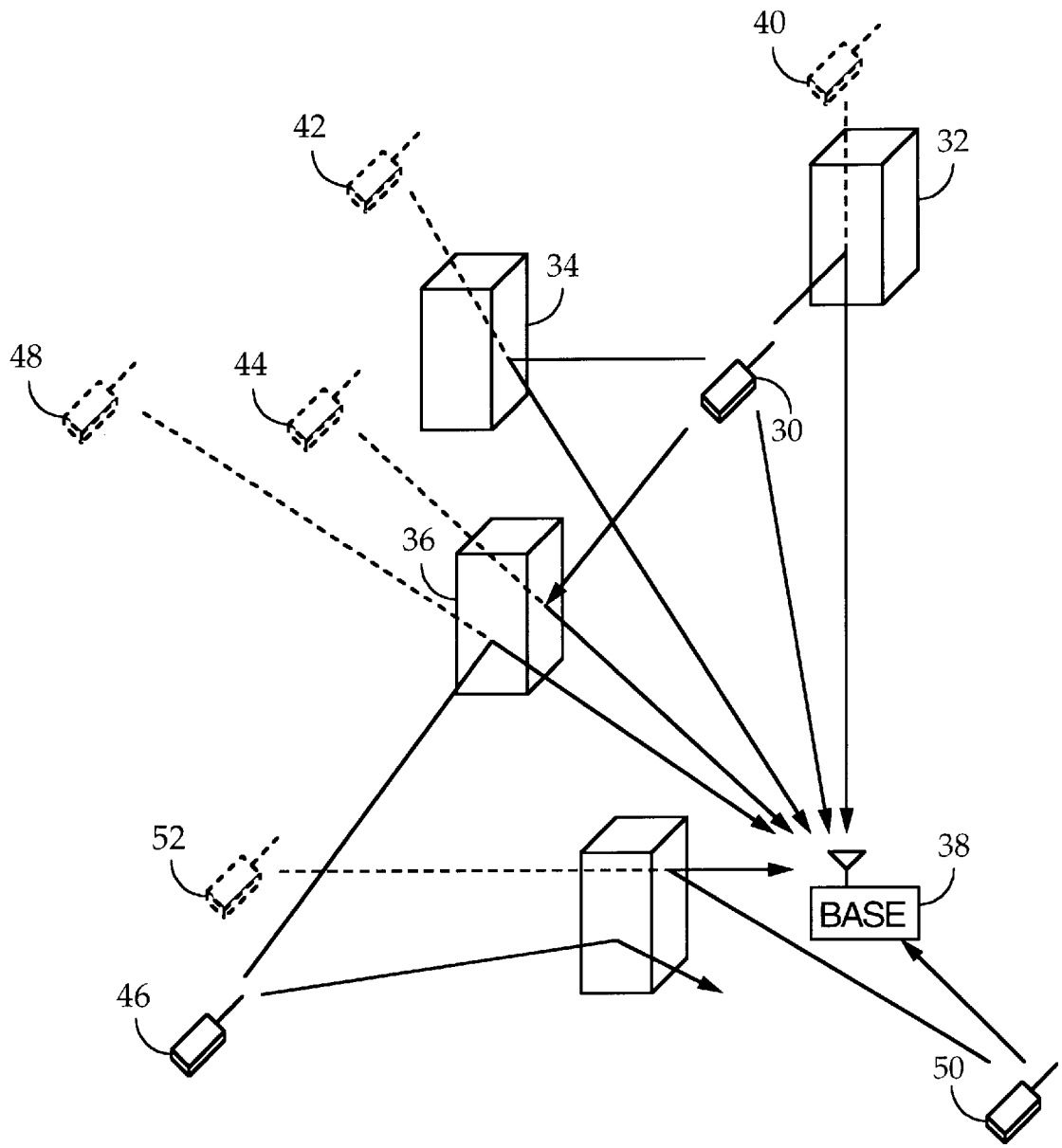
FIG. 1 shows several phones and a base station in a typical urban environment where severe multipath is present.
Figure 2:
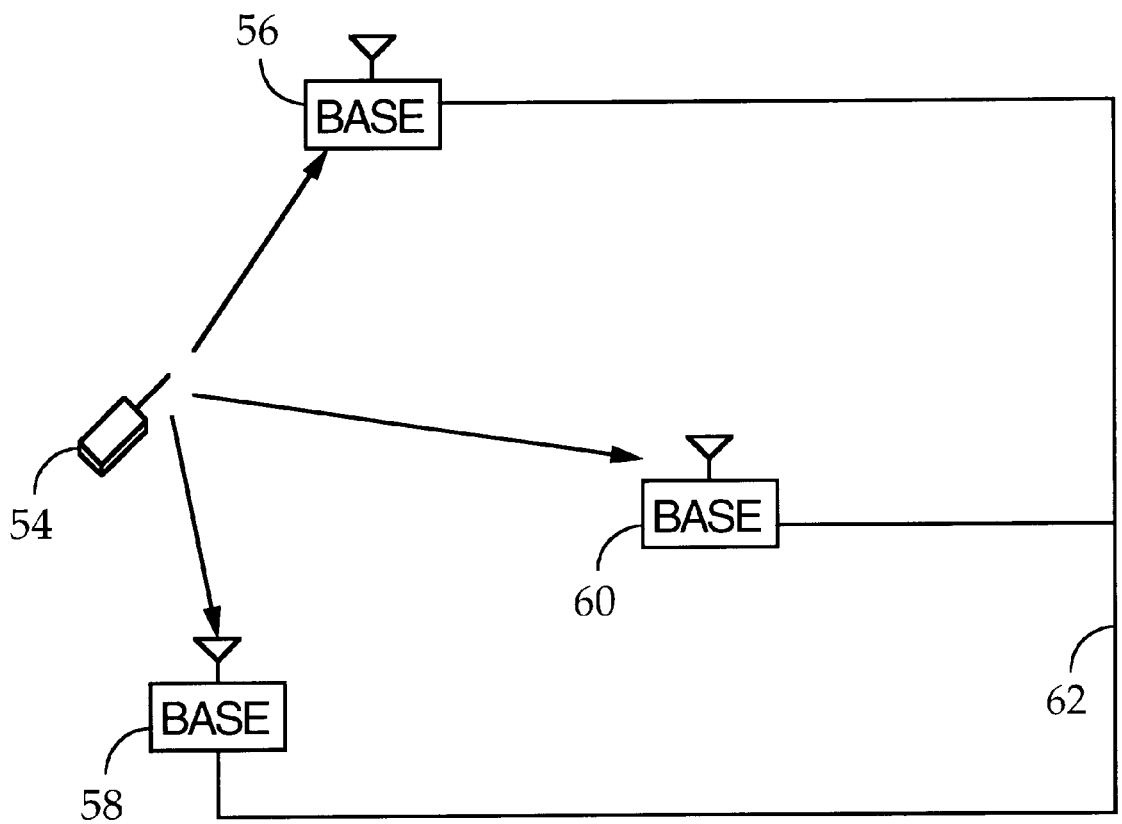
FIG. 2 illustrates a prior art method of locating phones based on temporal information shared between multiple base stations.
Figure 3:
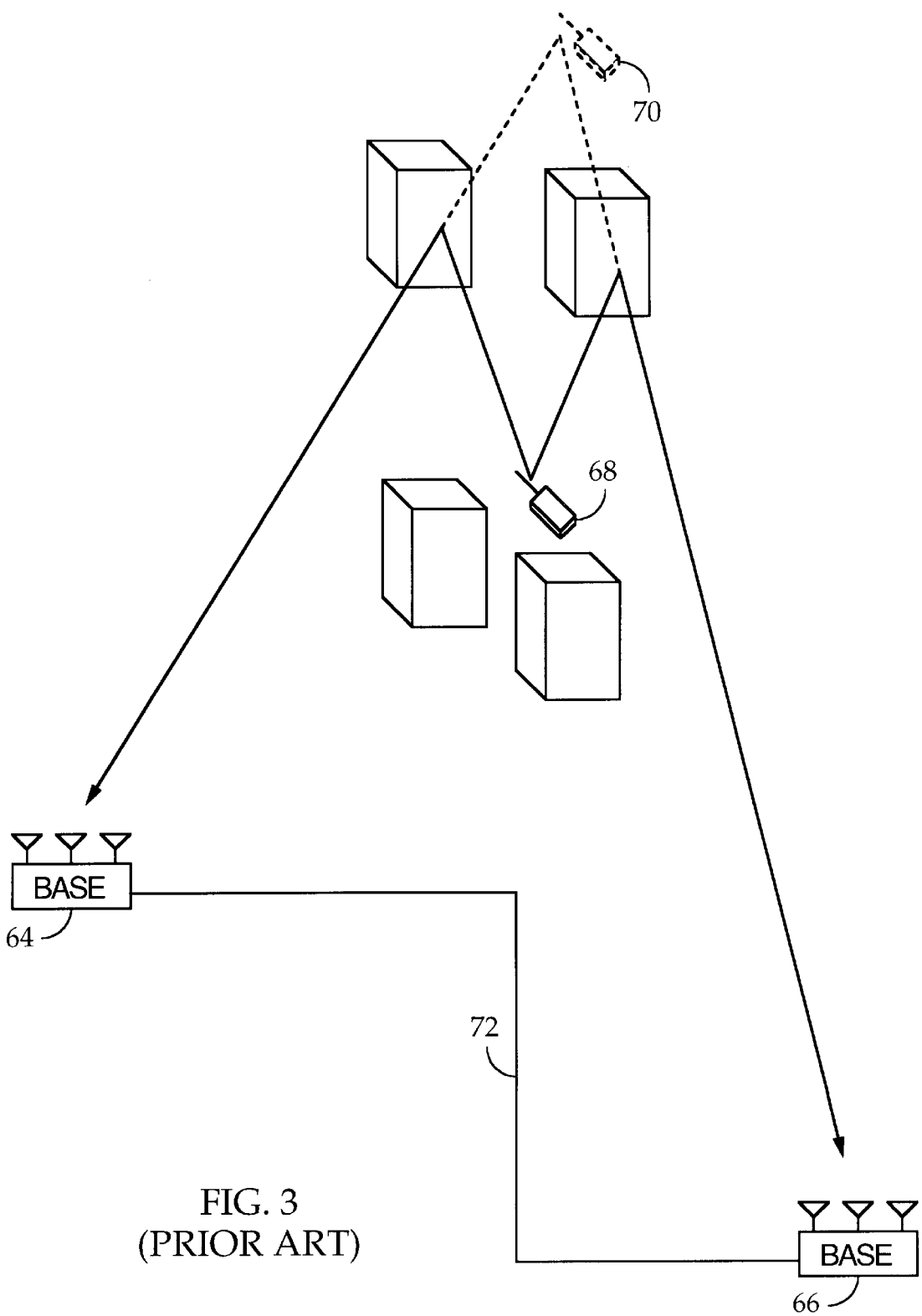
FIG. 3 illustrates a prior art method of locating phones based on direction finding from multiple base stations.

In addition to the signal subspace, it may be preferable in some circumstances to determine also a set of differential time delays for the multipath signals. For example, these delays may be used to further enhance the signal signature data in order to provide them with additional dependence upon location, thereby providing the system with increased accuracy. The differential delays also may be used to resolve ambiguities in location, such as may arise in the case of a stationary phone using a narrowband modulation scheme. Note that, in contrast with the time difference data in the prior art which consists of time differences of the direct signals arriving at several different base stations (FIG. 2), the differential time delay data used herein involves the time differences between the multipath signals (the direct path included) arriving at a single base station (see FIG. 4 and FIG. 8).

In the preferred embodiment, differential time delays between multipath signals may be calculated as follows. First one performs a blind estimation of the array response matrix A during the calibration procedure by techniques well-known in the art, such as high-order statistics. The columns of the matrix A consist of the set of q linearly independent array response vectors, $a_1, \ldots, a_q$. Note that in the case where the differential delays are small compared with the reciprocal of the signal bandwidth, the invention exploits transmitter movement to decorrelate signals and determine A. The matrix A is then used to determine a weight matrix W such that WA=I. Using W and the sampled signals, one then resolves the multipath signals and calculates their relative time delays. These time delays and the matrix A associated with each location are stored in the calibration database. (Since the signal subspace may be determined from A, it is not necessary to store the signal subspace if A is stored.) When attempting to locate a transmitter with an unknown location, this additional information in the database may be used to improve the accuracy as follows. After determining a set of likely locations using subspace matching, the stored matrix A is used to calculate differential time delays based on the sampled signals, as was done in the calibration procedure. These time delays are then compared with the stored time delays to help resolve location ambiguities.

In a preferred embodiment of the invention, the location of a transmitter is determined through the use of a database containing calibrated signal signatures and associated locations, as shown in TABLE 1. The locations $r_1, \ldots, r_N$ may be two or three dimensional. The signal signatures in the database include representations of the signal subspaces (such as the dominant eigenvectors of the covariance matrices or, alternatively, the matrices $A_1, \ldots, A_N$) and may also include sets of differential time delays, $d_1, \ldots, d_N$. It should be emphasized that the signal signature is not limited to the specific examples given here, but may include other characterizations as well.

TABLE 1

| Location | Signal Signature | |
|---|---|---|
| (x, y, z) | Subspace or A | Time Delays |
| $r_1$ | $A_1$ | $d_1$ |
| . | . | . |
| . | . | . |
| . | . | . |
| $r_N$ | $A_N$ | $d_N$ |

Although this database may be generated by various techniques, including, for example, analytical techniques based on ray tracing and other propagation models in conjunction with a detailed map of the service area, in the preferred embodiment it is generated by an empirical calibration procedure, as follows. As shown in FIG. 4, a phone 74 is connected via modem to a microprocessor, such as a common laptop computer, 86. Also connected to computer 86 is a global positioning system (GPS) receiver 88, which is able to determine its precise location through the reception of signals from GPS satellites 90, 92, and 94. In the preferred embodiment, GPS receiver 88 is a high accuracy GPS receiver. The GPS data can be corrected using a differential GPS receiver either at the base station or in the calibration mobile in order to improve accuracy. GPS receiver 88, computer 86 and phone 74 are connected so that precise location information from GPS receiver 88 is transmitted to computer 86 which, in turn, transmits the location information to phone 74 which further transmits the information to base station 76.

In the calibration procedure, GPS receiver 88, computer 86 and phone 74 are placed in a vehicle which moves to various locations throughout a base station service area. At each location, base station 76 determines the signal signature for that location and associates the signature with the GPS location information transmitted from phone 74. The signal signature and location information are then stored in a calibration database at the base station. This process is repeated every few seconds as the vehicle moves throughout the service area. The repetition can be more or less frequent depending on the degree of precision desired and the amount of computing resources available at the base station. Note that the calibration procedure may include the simultaneous use of several vehicles moving within the base station service area, wherein each vehicle is similarly equipped with a GPS receiver, a computer, and a phone operating on a unique signal frequency. Note also that the calibration procedure may include several different frequency bands corresponding to the different cellular standards used in the service area. Upon completion of the calibration process, the calibration database will contain a set of signal signatures and associated locations throughout the service area of the base station.

In the preferred embodiment, the calibration process includes post-processing to optimize the calibration table by eliminating redundant information. Such post-processing makes use of a measure of difference between subspaces, such as an angle between subspaces, to determine the extent to which signal signatures for adjacent locations differ from each other. Various such measures of difference between subspaces are known in the art and may be effectively used. Obviously, it is preferable to use a measure that admits of computationally efficient implementation. The post-processing may also include well-known techniques for smoothing, decimating, and/or averaging data.

In the preferred embodiment, the location of a phone in the service area may be determined as follows. Signals originating from a phone at an unknown location are received at the base station. A signal processor at the base station then determines the signal signature as described in detail above. The measured signal signature is then compared with the calibrated signal signatures stored in the database during the calibration procedure. Using a measure of difference between subspaces, such as an angle between subspaces, a set of likely locations is selected from the database. These likely locations are those locations whose associated calibrated signal signatures differ by less than a minimum threshold value from the measured signal signature. The difference measure is further used to provide a measure of the probability that each of the locations is the actual location. In contrast with prior art methods which provide only a single location, the present invention advantageously provides a whole set of likely locations together with their relative probabilities. Typically, the set of likely locations will include a location which is significantly more likely than other locations. This location then indicates the correct transmitter position. Sometimes, the set of likely locations may contain several equally likely locations, in which case additional processing and/or information is necessary to resolve the ambiguity in location.

In addition to the signal subspace which captures the directions-of-arrival of the multipath signals, the signal signature possibly includes additional information such as a set of differential time delays between the multipath signals. The time delays may be used to supplement the subspace matching in order to resolve ambiguity or to increase the accuracy of the location determination. The measured time delays can be compared with the calibrated time delays and a measure of their difference can be used in calculating the likelihood of various locations, as described previously. Another technique for resolving ambiguity is to exchange sets of likely locations between different base stations. Since the location information has already been determined independently at the separate base stations and no synchronization between base stations is necessary, such an exchange does not require high speed or high bandwidth communication lines, as in the prior art. Since the bases generate their respective sets of likely locations independently, and since the propagation paths of the signal to the different bases are different, only the true location is likely to be common to all sets. Consequently, this technique proves highly effective in resolving location ambiguity. Another way to resolve ambiguity is to use diverse polarized antennas. In this case, the signal signature is composed of two subspaces, one for each of the two orthogonal polarizations. This additional information provides more uniqueness to each locations and helps reduce the occurrence of ambiguity.

In addition to the above techniques which use additional measured information to resolve ambiguities, the preferred embodiment includes various other techniques for resolving ambiguities in the location. One technique for resolving such ambiguities is to compare likely locations with locations on a map. Assuming, for example, that a phone is most likely in a vehicle constrained to known roads, any off-road locations can be eliminated or assigned lower probabilities. Another technique for resolving ambiguity is a motion tracking system that associates sets of likely locations measured over the course of several seconds or minutes. Using realistic assumptions about the possible changes in phone location over the course of time, the ambiguities in location can be reduced or resolved. For example, it is very unlikely that a phone that has been located in one localized region of the service area will suddenly move to another location several miles away.

Figure 9:
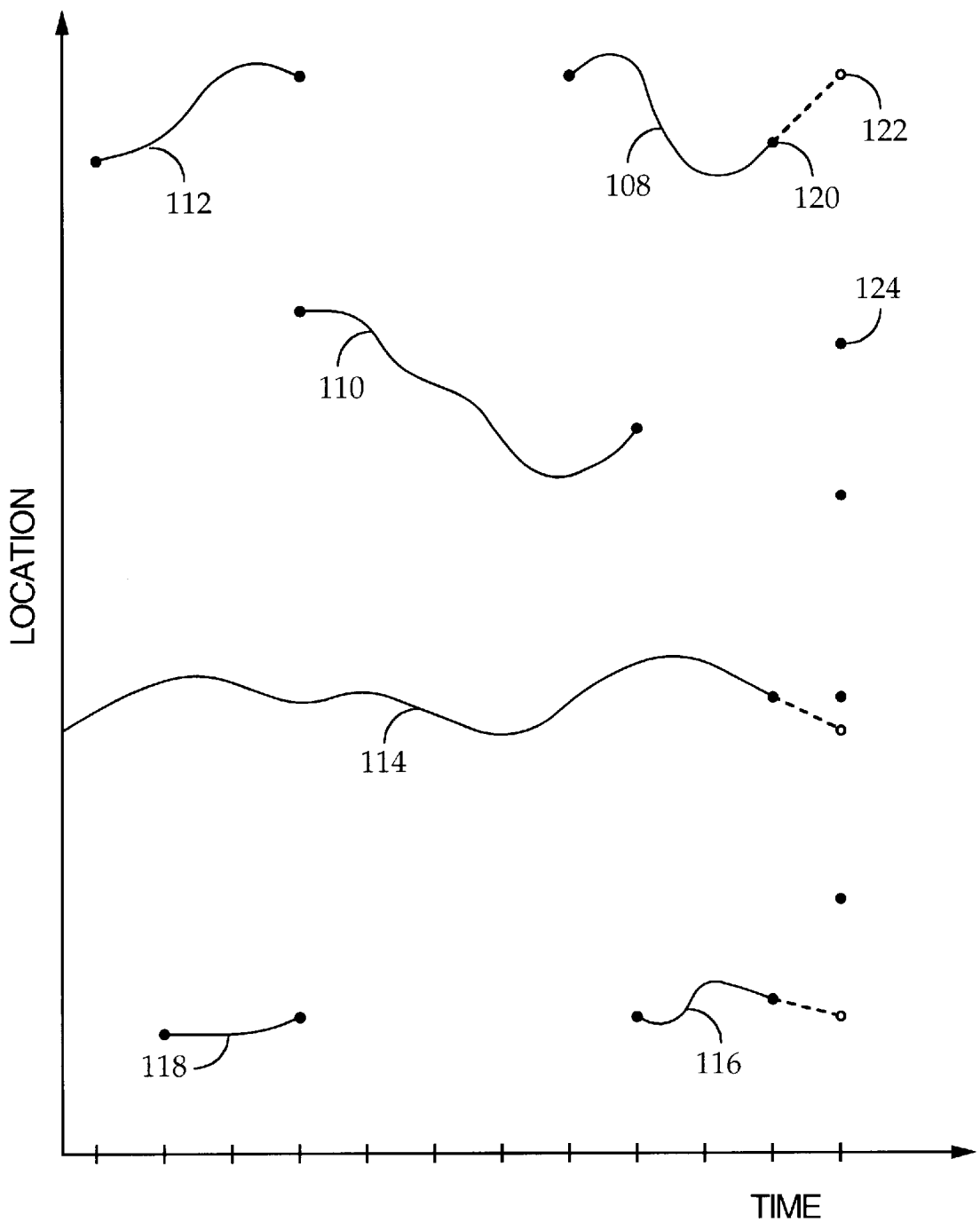
FIG. 9 is a graph of several tracks representing possible locations of a phone according to the present invention.

The tracking technique implemented in the preferred embodiment includes constructing trajectories, called tracks, from the sets of likely locations, updating the tracks when each set of likely locations is obtained, and determining the likelihoods of the tracks. Similar techniques are well-known in the art of military target tracking. FIG. 9 is a graph of six tracks 108, 110, 112, 114, 116, and 118, associated with a given phone. For simplicity of illustration, just one dimension of the location is plotted as a function of time. The current tracks have an end point corresponding to the most recent location of the track, and a predicted next point. For example, track 108 has an end point 120 and a predicted next point 122. Also shown in FIG. 9 is a set of points corresponding to the next measured set of likely locations. For example, the set includes point 124. Typically, in the next measured set of likely locations, some points will be close to the predicted next points of the tracks and some others will be far. Clearly, the points that are close to present tracks are more likely to correspond to the actual location.

The preferred embodiment of the tracking procedure is performed according to the following steps. Given a set of tracks and a set of likely locations, for each track calculate a predicted next location and compute its variance by, for example, the well-known Kalman filter. Using the likelihoods of the data points in the track, calculate the a priori probability of the track. Next, among all the possible pairwise associations between predicted next locations of tracks and the measured set of likely locations, determine the association that maximizes the a posteriori probabilities of the pairwise associations, i.e. find the best match between the predicted track locations and the actual locations. Eliminate associations whose distance is greater than a predetermined association threshold. Terminate any tracks that have K consecutive association failures. For any unassociated locations, initiate new tracks. New tracks are considered tentative until they have been confirmed. A tentative track is confirmed when I locations are associated to it out of J consecutive attempts. The integers I, J, and K, are design parameters that are selected in dependence upon the particular desired system tracking performance. All the tracks are then filtered using the well-known Kalman filter. The most likely location of the phone is the new (filtered) endpoint of the most likely track. Typically, there will be various short tracks 108, 110, 112, 116, 118 corresponding to erroneous locations, and one longer track 114 corresponding to the correct location. Other tracking methods may be used without departing from the scope of the present invention. In addition, this tracking method may be used alone or in conjunction with other methods of reducing ambiguity.

Although the signal signature is a relatively stable function of location, certain changes in the signature may take place which may affect the accuracy of the database of calibrated signal signatures. Such changes may result from the construction or destruction of buildings, or from seasonal changes in the natural environment that affect multipath. Accordingly, the preferred embodiment of the present invention includes techniques for updating the database. A direct method involves performing the calibration procedure at regular intervals or continuously. A cost-effective method of continuous calibration could use a fleet of commercial delivery vehicles. Since such vehicles typically pass through many locations in a localized region, a dedicated calibration system could piggy-back on these vehicles and allow continuous updating of the database. Alternatively, or in addition, specialized vehicles could be sent out periodically to calibrate the service region. It should also be noted that in the case where two or more base stations can simultaneously receive signals from such a calibration unit, its signals can be used by all these base stations to independently calibrate their respective databases.

Figure 10A:
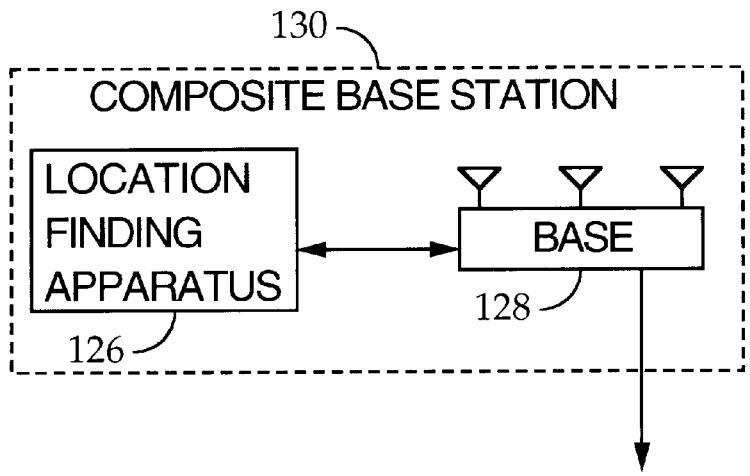
FIGS. 10A, 10B, and 10C are block diagrams of three ways of connecting an apparatus of the present invention to an existing base station.
Figure 10B:
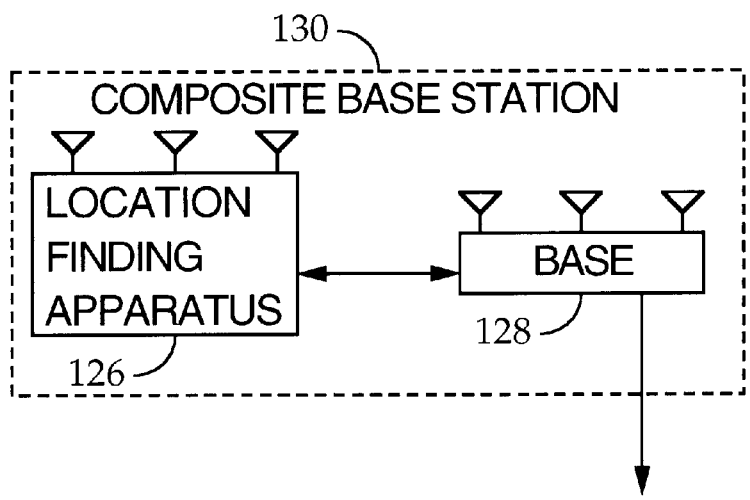

It is an important advantage of the present invention that the location finding apparatus can use the antenna array of a presently existing base station. As shown in FIG. 10A, the apparatus 126 of the present invention may be a separate device located near a presently existing cellular base station 128, resulting in a composite base station 130. In the preferred embodiment, apparatus 126 uses the antenna array of existing base station 128. Alternatively, as shown in FIG. 10B, the apparatus 126 may use its own antennas. In yet another case, shown in FIG. 10C, the apparatus 126 is totally separate from the base station 128, and may be located anywhere in the service area of the base station. Accordingly, the term base station in the above description is to be construed as indicating the composite base station, or the apparatus 126 alone. This modular aspect of the invention allows the present location finding apparatus to be easily added to existing cellular telephone networks without necessarily involving expensive modification to existing base stations.

Figure 11A:
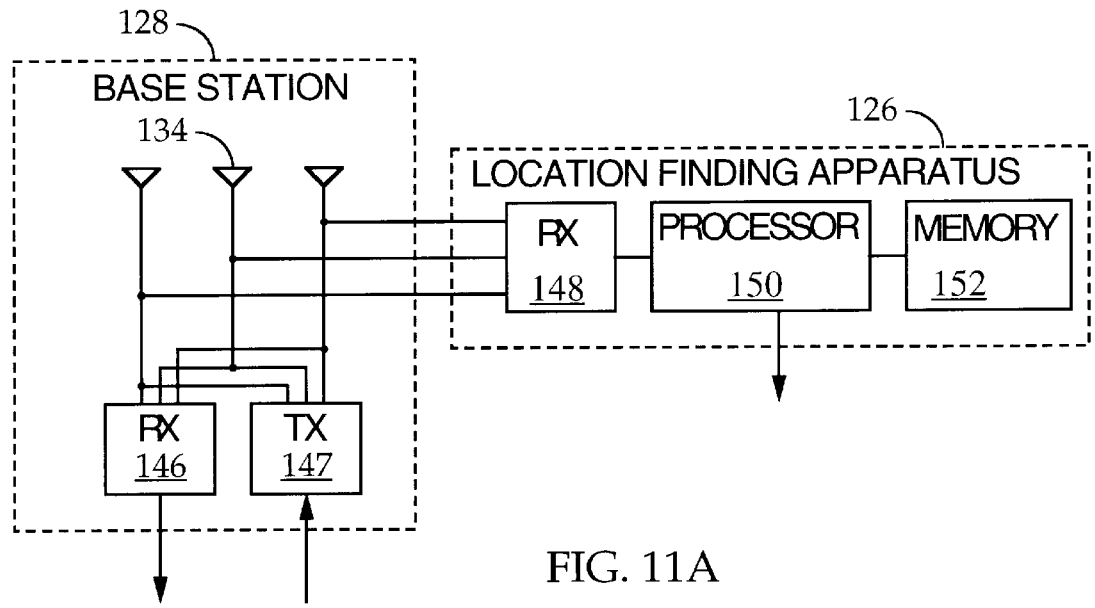
FIGS. 11A and 11B are block diagrams of the major components of an apparatus of the present invention in connection with those of an existing base station.
Figure 11B:
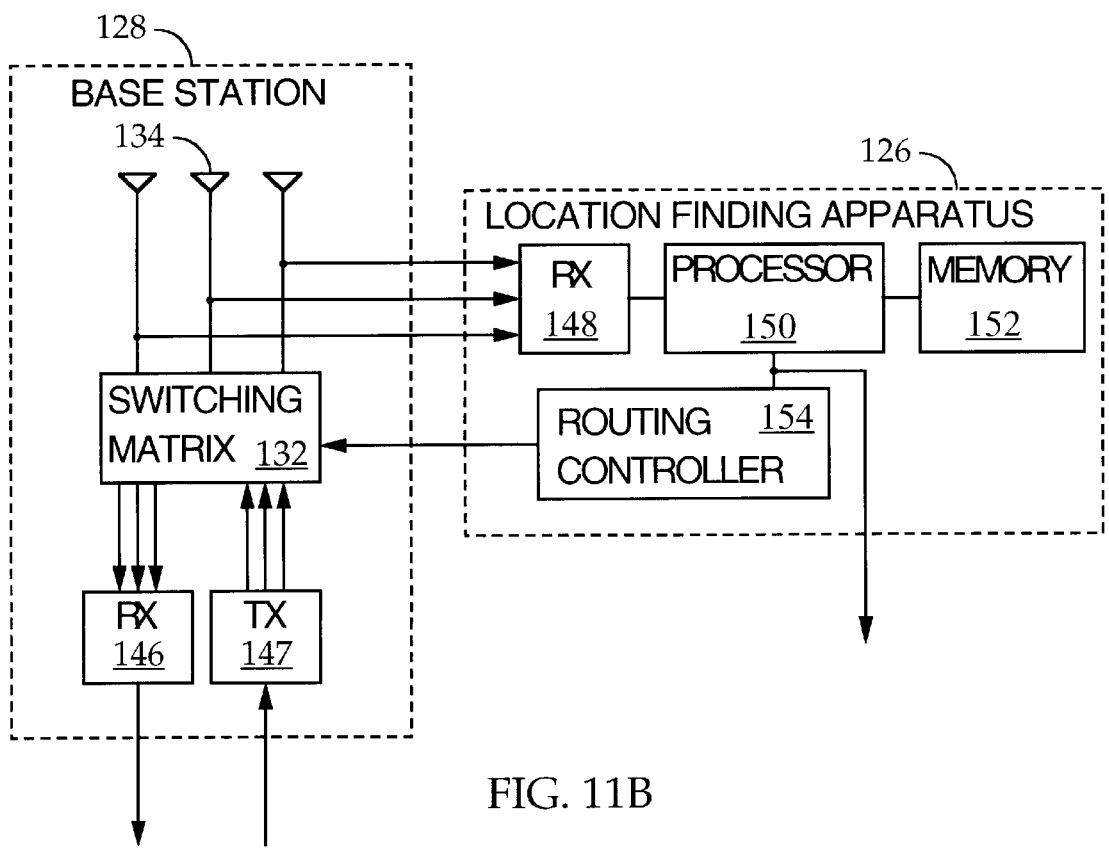

Block diagrams are shown in FIG. 11A and FIG. 11B illustrating the relationship between essential components of two embodiments of the invention. In FIG. 11A, existing base station 128 has antennas 134, multi-channel receivers 146, multi-channel transmitters 147, among other components well-known in the art (not shown). FIG. 11B is a similar embodiment with a switching matrix 132. An apparatus 126 is connected to the existing base station 128 providing the resulting composite base station with location finding capability. Apparatus 126 includes a multichannel receiver 148 which receives signals from the antennas 134. The signals are sent to multi-purpose signal processor 150 which performs subspace identification, database searching, tracking, and other processing as required. A memory device 152 is accessible by processor 150 and is used to store signal signature calibration data, location data, geographical map data, and/or other data as required. In the embodiment shown in FIG. 11B, location information determined by processor 150 is sent to a location finding routing controller 154 which sends control signals to switching matrix 132 in order to optimize channel capacity in the cell by appropriately routing signals to various antennas based on location information about the signals. In both FIG. 11A and FIG. 11B location information is sent over external communication lines for use by other base stations or other systems, as will be described in more detail below.

Figure 10C:
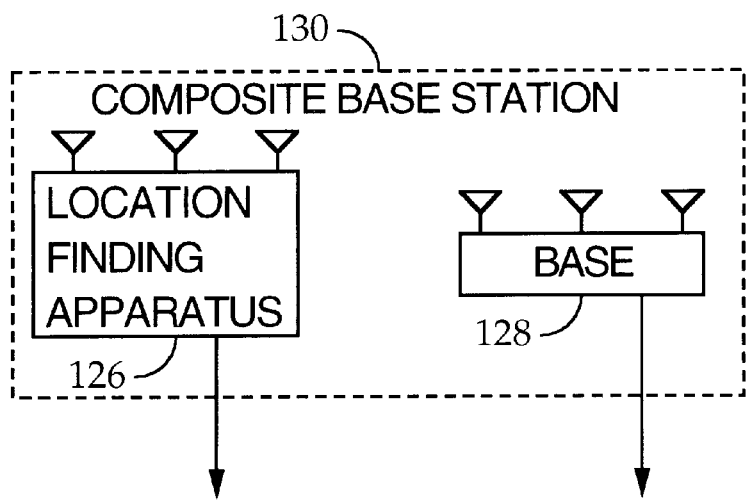

In the preferred embodiment of the invention, the location finding method and apparatus described above is integrated into a cellular telephone network, for example, as shown in FIG. 10A FIG. 10B or FIG. 10C. The accurate and reliable location information provided by the present invention can be used for many important applications. For example, location information can be sent by the cellular operator to third party service providers for various uses. For example, it can be used in conjunction with 911 calls to provide dispatchers with immediate locations for callers under emergency circumstances. Location information also can be used for enhanced 411 service, i.e. for real time caller location associated services, such as providing directions to lost motorists. The location information can be sent to an automatic road toll management system or used for smart vehicular scheduling on a highway network. For example, the present invention may be used to provide enhanced 911 response of emergency vehicles by tracking the locations of emergency vehicles, coordinating location information with street map databases, and communicating specific optimal directions to appropriate vehicles. Such an enhanced 911 service is an important advantage of the present invention. Location information also can be used for remote monitoring of health conditions of patients, for remote control and/or navigation of robot devices, and for numerous other such special purpose applications.

Figure 13:
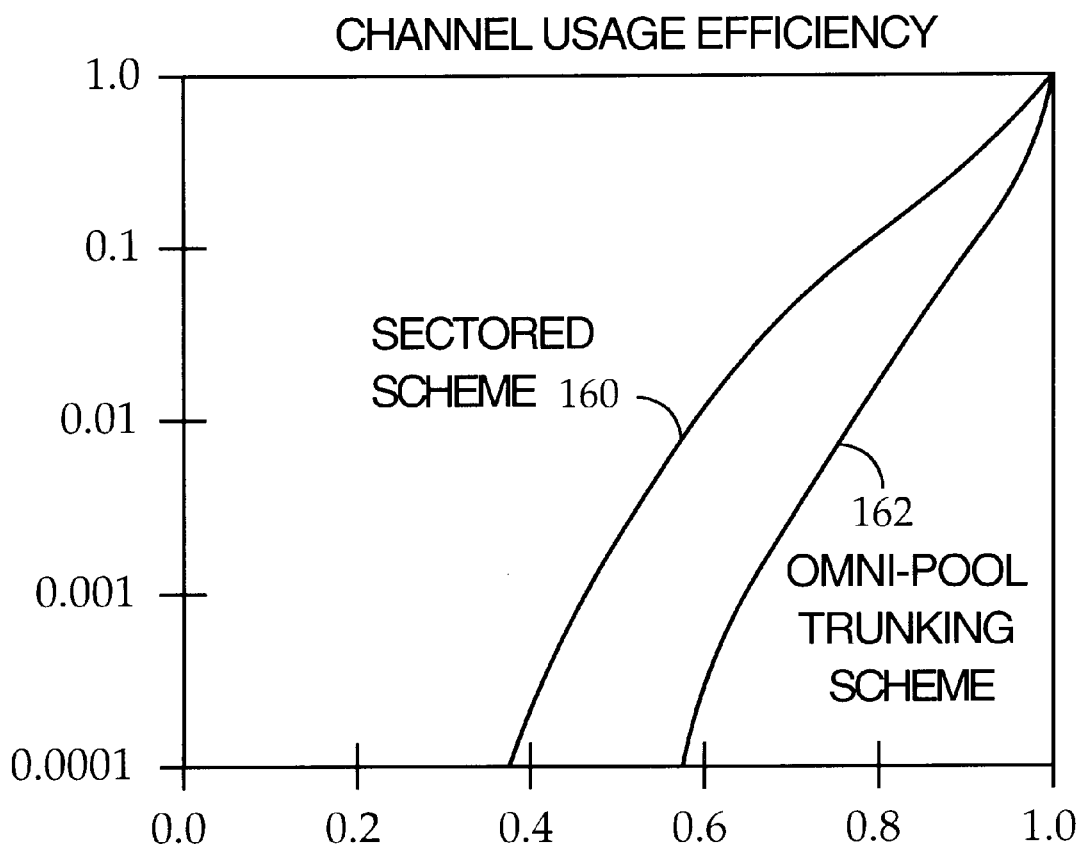
FIG. 13 is a graph of channel usage efficiency for two trunkpool schemes.

Important and very valuable applications of accurate location information are those associated with the performance of the cellular network itself. For example, location information can be used for location-based billing of cellular calls and to help combat cellular fraud. It also can be used in conjunction with antenna selection techniques to improve individual cell efficiency and capacity. As shown in FIG. 11B, location information can be used to control switching matrix 132 which allows individual antennas 134 to be selected for transmission and/or reception of specific frequency channels. Since antennas at existing cellular base stations have differing directional responses, this technique allows more efficient assignment and use of frequency channels within presently existing cells. In particular, by using location information to pool channels among different sectors, the base station can reduce blocking and increase trunking efficiency. For example, FIG. 13 is a graph illustrating channel useage efficiency for a seven-cell reuse using a sectored scheme 160 and for a seven-cell reuse using an omni-pool trunking scheme 162.

In addition, location information provided by the present method can be used to improve the quality of and extend the range of existing base stations by beamforming in both receiving and transmission. For receiving, one can use the matrix A stored in the calibration table to compute the optimal beamformer. For transmission, one has to compute first the corresponding A matrix for the transmission frequency. This can be done as part of the calibration process by probing techniques, i.e. by using several different weight vectors and computing the received signal at the mobile. The matrix A can then be calculated from this data off-line.

Figure 14:
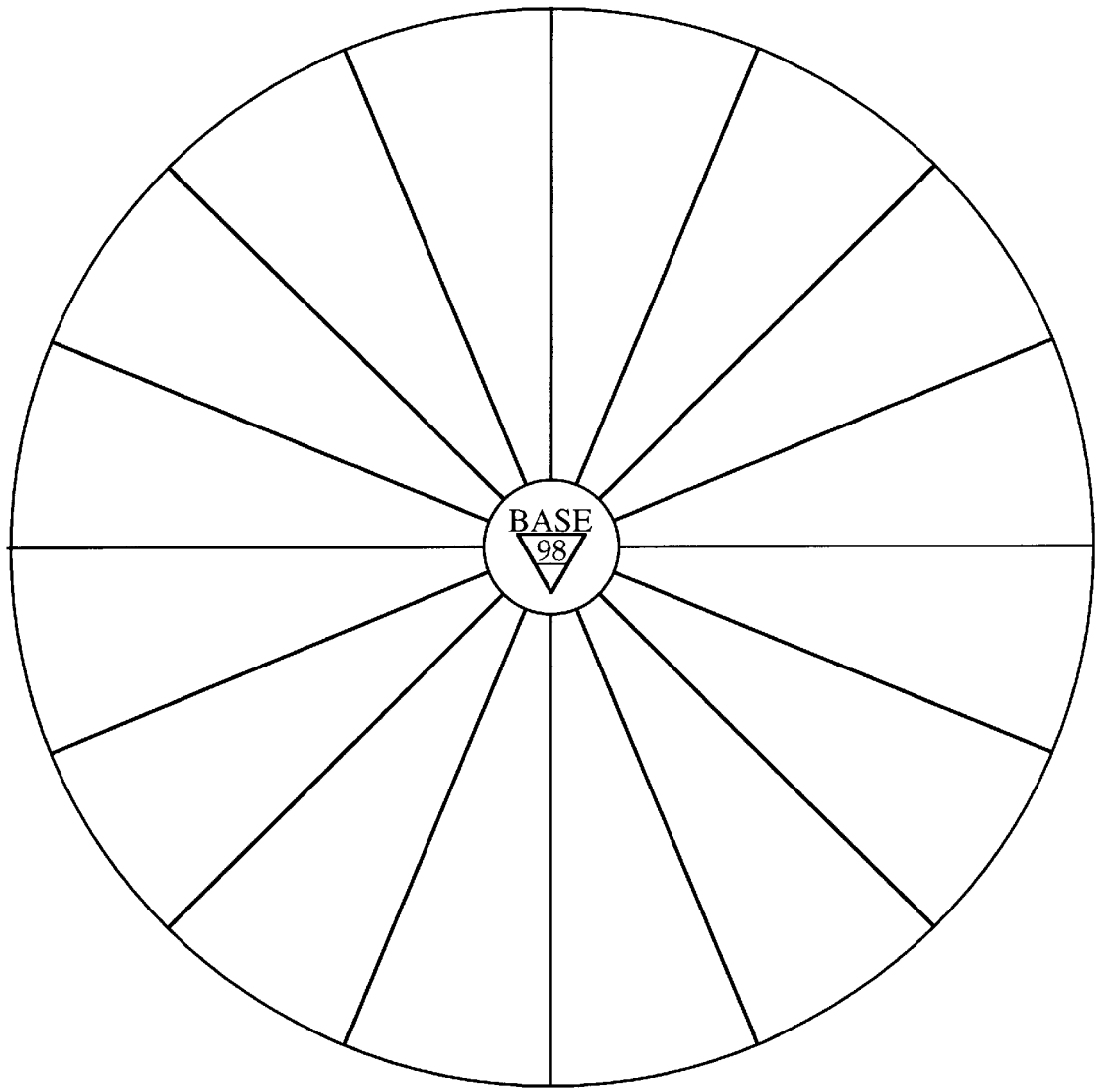
FIG. 14 is a schematic diagram illustrating a cell divided into sectors, as is known in the art.
Figure 15:
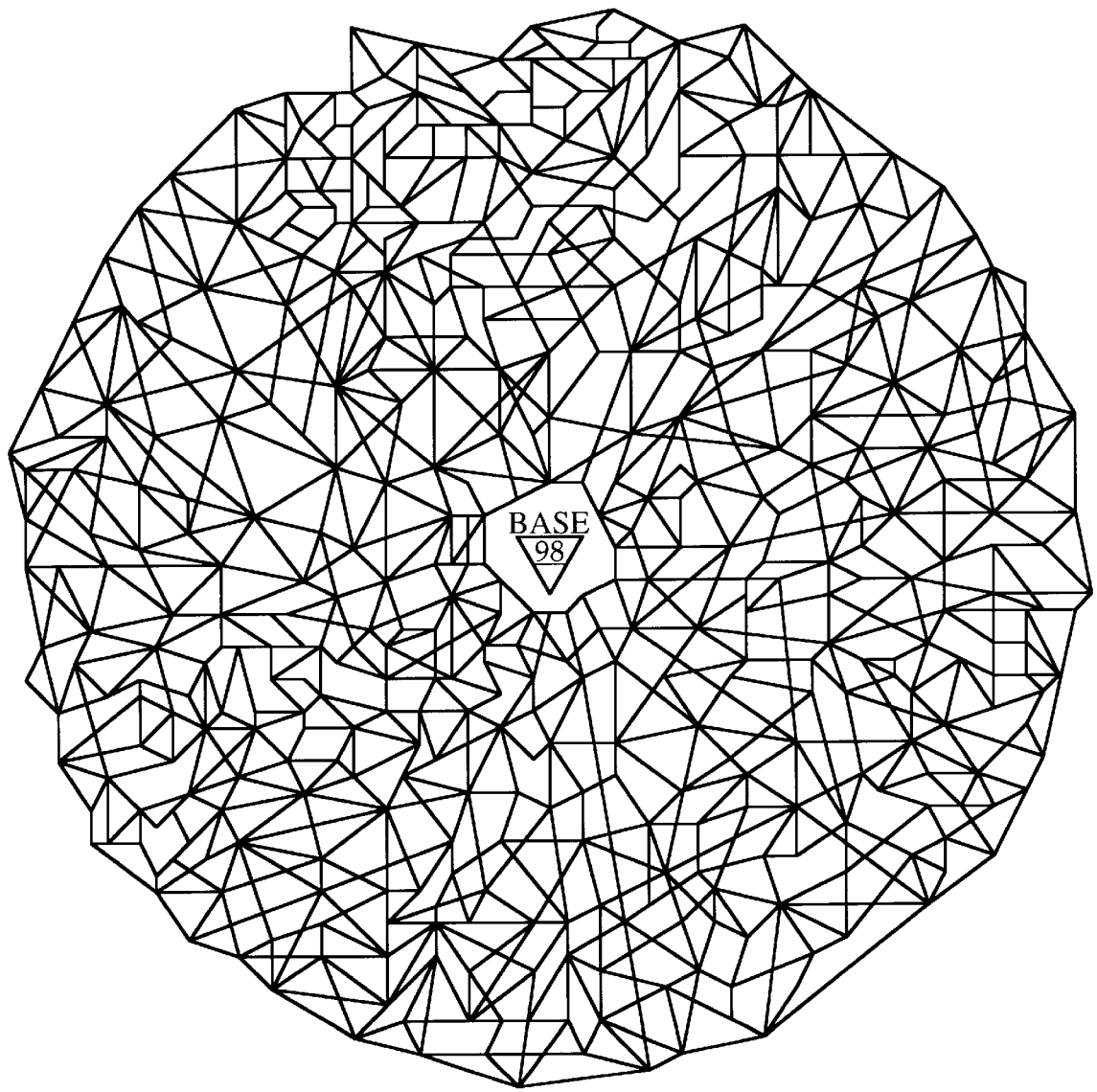
FIG. 15. is a schematic diagram illustrating a cell divided into subcells according to the present invention.

Also, the location finding method can be used to implement location division multiple access (LDMA) to increase the capacity of cellular systems by allowing several phones to use the same frequency in the same base station service area. In contrast to switched beam techniques which divide the service area into large spatial sectors, as shown in FIG. 14, LDMA divides the service area into small localized subcells, as shown in FIG. 15. The subcells shown in FIG. 15 are based on the computation of signal signatures, such as the signal subspace. The shapes and sizes of the localized subcells are determined by the multipath reflectors in the environment. In particular, each subcell is characterized by a unique signal signature, so that transmitters in different subcells display distinct signal signatures. Accordingly, the present technique of LDMA often permits the isolation of interferers which would be in the same switched beam sector.

Because the subcells in FIG. 15 are much smaller than the sectors of FIG. 14, the present technique provides far more accurate location information. Although the size and shape of each subcell will depend on the physical extent over which the subspace is substantially constant, the subcells in a typical urban environment have a size of approximately 100 meters or less. The present method, therefore, permits location determination to within one half of a block or better.

The present invention has an important advantage over spatial division multiple access (SDMA) techniques in that location-based computations can be done off-line once the calibration database for the base station has been determined. Frequency assignment and beamforming can then be performed quickly in real time since a large amount of preprocessing has been performed in advance. Conventional SDMA techniques, in contrast, require complex computations to be performed in real time.

To implement this scheme, the beamforming in both the reception and transmission is computed from the whole set of A matrices corresponding to all the phones using the frequency. To compute the locations of all the users, the preferred embodiment is modified to incorporate techniques, such as those based on high order statistics, that can blindly estimate the array vectors in the presence of statistically independent interferers. This step should be carried out on every batch of 100 samples spanning 1 ms sampling interval. Beamforming techniques such as this will improve signal to noise ratios, increase the overall capacity of the cellular network, and allow a higher density of base stations to be deployed. Network management techniques are used to coordinate nearby base stations to efficiently share frequencies based on the locations of a set of transmitters.

It will be appreciated that the foregoing provides a system for tracking and locating all cellular telephone traffic from a single base station. The present method does not require a calibrated antenna array, does not require the phones to be responsive or cooperative, and does not require line-of-sight communication between the array and the phones.

The foregoing system also provides a means for trouble shooting a base station. The array response matrix A can be used to continually monitor the performance of the array of antennas and/or equipment at the base station. For example, sudden and dramatic changes in the elements of the A matrix for all locations are likely due to hardware damage to the base station. An examination of the A matrices can be used to isolate and identify the damage. Smaller changes in A may indicate minor hardware changes in the base station and/or changes in the propagation environment. A comparison of such changes in the array response at one base station with those at another can be used to determine whether or not the changes are isolated to one station or common to all stations in the shared environment.

It is also possible to perform certain database corrections using only signals from regular phones. For example, in the case where seasonal atmospheric changes cause alterations in the multipath, an analysis of signals over the course of several days or weeks can detect a gradual drift in the collective signal signatures. After clearly identifying such a drift, the database signatures can be corrected to compensate for it, thus eliminating the need for performing a potentially costly calibration procedure. A similar technique can be used to correct the database to compensate for signal signature changes caused by the construction or destruction of reflecting objects in the environment. In this case, an analysis of signal signatures over time will display a consistent and gradual shift for those signatures associated with locations in the vicinity of the objects. Having identified such bias, the database can then be compensated accordingly. As an aid to the identification of these environmental biases, base stations may share with each other certain information, e.g. the array response matrix A for a certain location. If both base stations detect a shift, it is likely due to an environmental change. It is a significant feature of the present invention that high bandwidth communication channels are not required to communicate such information between base stations.

It will be appreciated that an aspect of the present invention is that it does not require broadband or spread spectrum schemes in order to accurately locate a transmitter because the subspace signature may be determined accurately using a narrowband scheme. In contrast, the accuracy of prior art TOA techniques for location finding is inversely proportional to the bandwidth. Note however, that the accuracy of the differential time delays is dependent upon the bandwidth. Accordingly, although a large bandwidth is not necessary to practice the present invention, a larger bandwidth provides better accuracy in the case where the signature includes differential time delays.

Figure 12:
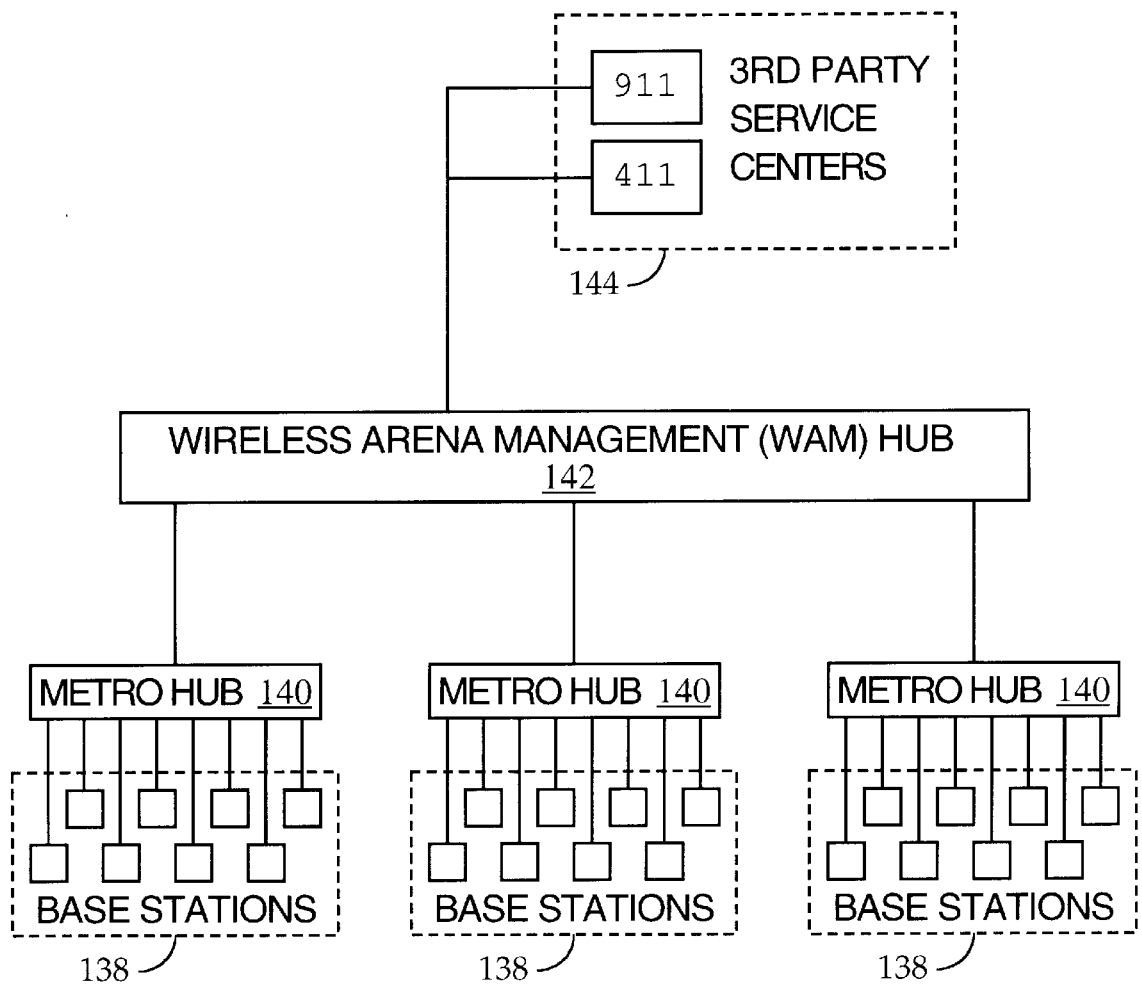
FIG. 12 is a schematic diagram of the system architecture of a cellular network management system according to the present invention.

The foregoing important applications, as well as many others, can be integrated into a wireless arena management (WAM) system, shown in FIG. 12 which makes use of location information gathered at individual base stations 138 to manage metro networks individually and collectively. For example, location information sent from individual base station sites 138 to metro hubs 140 or mobile switching centers (MSC) can be used to assist in hand-off between cells, for automatic trunking, for channel borrowing, for channel capacity optimization, to more efficiently allocate cellular frequencies, and to increase the capacity of the metro network. On a global level, WAM hubs 142 link the metro hubs 140 and provide access to third party service centers 144, for example, appropriate regional 911 and 411 service centers. It is a significant feature of the present invention that high bandwidth communication lines are not required to determine and communicate location information within such a network. Accordingly, the present invention enables for the first time the ability to use location information to actively monitor and/or manage all the wireless traffic in a network.

What is claimed is:

1. In a wireless communication system comprising a mobile transmitter and a receiver connected to an antenna array, a method for estimating the location of the mobile transmitter, the method comprising:

receiving at the antenna array signals originating from the mobile transmitter, wherein the signals comprise p-dimensional array vectors sampled from p antennas of the array;

determining from the received signals a signal signature, wherein the signal signature comprises a measured subspace, wherein the array vectors are approximately confined to the measured subspace;

comparing the signal signature to a database comprising calibrated signal signatures and corresponding location data, wherein the comparing comprises calculating differences between the measured subspace and calibrated subspaces; and selecting from the database a most likely calibrated signal signature and a corresponding most likely location by using the calculated differences.

2. The method of claim 1 further comprising the step of optimizing channel capacity at a base station through the use of the selected location data.

3. The method of claim 2 wherein the optimizing channel capacity step comprises implementing a technique chosen from the group comprising beamforming, location division multiple access, automatic trunking, and channel borrowing.

4. The method of claim 1 further comprising communicating the selected location to a service provider selected from the group comprising an emergency 911 dispatcher, a road toll management system, a cellular network management system, and an enhanced 411 service provider.

5. The method of claim 1 further comprising using the selected location for location based billing.

6. The method of claim 1 further comprising using the selected location for location division multiple access.

7. The method of claim 1 further comprising using the selected location for assisting hand-off between cells.

8. The method of claim 1 further comprising using the selected location to control an antenna switching matrix such that channel blocking is reduced and trunking efficiency is increased.

9. The method of claim 1 further comprising selecting from the database a set of likely calibrated signal signatures and their corresponding likely locations, and associating the selected likely locations with tracks determined from a set of previously selected likely locations.

10. The method of claim 9 wherein the step of associating the selected likely locations with the tracks comprises determining a pairwise association between predicted next locations and the selected likely locations, wherein the pairwise association maximizes a set of a posteriori probabilities of pairwise associations.

11. The method of claim 1 further comprising checking the most likely location for consistency with map information.

12. The method of claim 1 further comprising comparing the most likely location with a set of likely locations derived from signals received at a separate antenna array.

13. The method of claim 1 wherein the database is generated by a calibration procedure comprising associating GPS location data transmitted from the mobile with the signal signature from the mobile.

14. The method of claim 13 wherein the mobile is in motion during the data transmission.

15. The method of claim 13 wherein the calibration procedure further comprises post-processing to optimize the calibration table.

16. The method of claim 1 wherein the step of determining the signal signature comprises calculating a set of dominant eigenvectors of an array covariance matrix.

17. The method of claim 16 wherein the array covariance matrix is calculated from the array vectors.

18. The method of claim 1 wherein the step of determining the signal signature comprises calculating a set of differential time delays between rays of the received signals at the antenna array.

19. The method of claim 1 wherein the step of determining the signal signature further comprises estimating an array response matrix.

20. The method of claim 1 wherein the step of comparing the signal signature to the database comprises calculating an angle between the measured subspace and a calibrated subspace.

21. The method of claim 1 wherein the step of receiving signals from the mobile comprises sampling the antennas a number of times to obtain a set of complex signal envelopes and calculating from the set of complex signal envelopes an array vector.

22. The method of claim 21 wherein the calculating of the array vector comprises finding a dominant eigenvector of a correlation matrix of the set of complex signal envelopes.

23. An apparatus for locating a mobile transmitter in a wireless communications system, the apparatus comprising:

a memory device containing a database of calibrated signal signatures and associated location data, wherein the signal signatures comprise calibrated subspaces;

a multichannel receiver connected to an antenna array for receiving signals from the mobile transmitter, wherein the signals comprise p-dimensional array vectors sampled from p antennas of the array; and a signal processor connected to the receiver and to the memory device, wherein the signal processor is programmed to determine from the signals a signal signature comprising a measured subspace to which the array vectors are approximately confined, and to further determine a most likely location from a comparison of the signal signature with the calibrated signal signatures in the memory device, wherein the comparison comprises calculations of differences between the measured subspace and calibrated subspaces.

24. The apparatus of claim 23 wherein the database contains differential time delays associated with the location data and calibrated signal signatures.

25. The apparatus of claim 23 wherein the memory device contains tracks representing past likely locations of the mobile transmitter, and wherein the signal processor is adapted to determine the most likely location from a most likely track.

26. The apparatus of claim 23 wherein the signal processor is adapted to determine the most likely track from a best pairwise association of present likely locations and predicted likely locations.

27. The apparatus of claim 23 wherein the memory device contains geographical map data.

28. The apparatus of claim 23 further comprising a communication link adapted to transmit the most likely location from the signal processor to a base station switching matrix.

29. The apparatus of claim 23 further comprising a communication link adapted to transmit the most likely location from the signal processor to a wireless arena management system.

30. The apparatus of claim 23 further comprising a communication link adapted to transmit the most likely location from the signal processor to a separate base station.

31. The apparatus of claim 23 wherein the signal processor is adapted to determine the most likely location also from a set of alternate likely locations derived from signals received at a different antenna array.

32. A wireless communication system comprising:
a plurality of radio transmitters;
a plurality of base stations, wherein each base station comprises an antenna array coupled to signals from the transmitters, a multichannel receiver connected to the antenna array and producing received signals comprising array vectors, a memory storage device containing a database of calibrated signal signatures comprising calibrated subspaces, and a signal processor connected to the receiver and storage device and programmed to calculate signal signatures comprising a measured subspace to which the array vectors are approximately confined and to determine likely locations of the transmitters based upon a comparison of the signal signatures with a database of calibrated signal signatures, wherein the comparison comprises calculations of differences between the measured subspace and calibrated subspaces.

33. The system of claim 32 further comprising communication lines between the base stations, wherein the likely locations are determined based additionally upon a comparison of alternative likely locations sent over the communications lines.

34. The system of claim 33 wherein the service provider is a service chosen from the group consisting of a 911 dispatcher, a 411 service provider, a remote monitoring service provider, an automated toll service, a location based billing service, and a robot navigational service.

35. The system of claim 32 further comprising a service provider and communication lines between the base stations and the service provider, wherein the system sends transmitter location information from the base stations to the service provider over the communication lines.

36. The system of claim 32 further comprising a hub and communication lines between the hub and the base stations, wherein the system is adapted to communicate transmitter location information of all the transmitters from the base stations to the hub, and to use the information to manage system traffic for improved system performance.

37. A method for trouble shooting a wireless communication base station comprising an antenna array, a receiver, a memory storage device, and a signal processor, the method comprising:
receiving signals at the antenna array from a transmitter at a known location;
performing a blind estimation of a response of the antenna array, wherein the estimation is based upon the received signals; and
comparing the response to a calibrated response stored in the memory device, where the calibrated response is associated with a calibrated location near the known location.

38. The method of claim 37 further comprising receiving information from another base station pertaining to changes in another response at the other base station to the same transmitter.

39. The method of claim 38 further comprising comparing the response to past responses at the base station stored over a period of weeks.

40. In a wireless communication system comprising a mobile transmitter and a receiver connected to an antenna array, a method for estimating the location of the mobile transmitter, the method comprising:
receiving at the antenna array signals originating from the mobile transmitter;
determining from the received signals a signal signature;
comparing the signal signature to a database comprising calibrated signal signatures and corresponding location data;
selecting from the database a most likely calibrated signal signature and a corresponding most likely location; and
updating the database to correct for changes in the signal propagation environment.

41. The method of claim 40 wherein the updating step comprises correlating signal signatures over a period of time.

42. The method of claim 40 wherein the updating step comprises receiving information from another base station and using the information to confirm that changes are due to changes in the signal propagation environment.

43. In a wireless location finding system, a method for generating database of locations and corresponding signal signatures, the method comprising:
receiving at an antenna array signals originating from a moving transmitter, wherein the signals comprise p-dimensional array vectors sampled from p antennas of the array;
calculating from the received signals a signal signature, wherein the signal signature comprises a multi-dimensional subspace, and wherein the array vectors are approximately confined to the measured subspace;
associating the signal signature with a location of the transmitter; and
storing the signal signature and associated location in a calibration database.

44. The method of claim 43 wherein the signals are sampled over a distance travelled by the transmitter, wherein the distance is sufficiently large that direct and multipath components of the signals are decorrelated.

* * * * *